United States Patent [19]
Lipert

[11] 4,293,506
[45] * Oct. 6, 1981

[54] LIQUID CIRCULATING DEVICE

[75] Inventor: Peter Lipert, Dollard des Ormeaux, Canada

[73] Assignee: Atara Corporation, Dorval, Canada

[ * ] Notice: The portion of the term of this patent subsequent to Feb. 5, 1997, has been disclaimed.

[21] Appl. No.: 54,826

[22] Filed: Jul. 5, 1979

Related U.S. Application Data

[63] Continuation-in-part of Ser. No. 3,707, Jan. 15, 1979, Pat. No. 4,187,263.

[51] Int. Cl.³ .............................................. B01F 3/04
[52] U.S. Cl. .................................... 261/77; 137/209; 210/220; 261/123
[58] Field of Search .................. 261/36 R, 77, 119 R, 261/120, 121R, 123, DIG. 75; 137/206, 209; 210/180, 220, 221 P; 405/22

[56] References Cited

U.S. PATENT DOCUMENTS

| | | | |
|---|---|---|---|
| 3,246,761 | 4/1966 | Bryan et al. | 210/180 |
| 3,436,162 | 4/1969 | Nohl et al. | 261/120 X |
| 3,542,524 | 11/1970 | Kimble et al. | 261/121 M X |
| 3,592,450 | 7/1971 | Rippon | 261/123 |
| 3,628,775 | 12/1971 | McConnell et al. | 210/220 X |
| 3,852,384 | 12/1974 | Bearden | 261/77 |
| 3,968,086 | 7/1976 | Romanowski | 261/77 |
| 4,096,215 | 6/1978 | Albrecht | 261/119 R X |
| 4,169,873 | 10/1979 | Lipert | 261/77 X |
| 4,187,263 | 2/1980 | Lipert | 261/77 |

Primary Examiner—Richard L. Chiesa
Attorney, Agent, or Firm—McAulay, Fields, Fisher, Goldstein & Nissen

[57] ABSTRACT

An apparatus is provided for causing circulation within a large body of fluid. The apparatus comprises a "large bubble" generator exposed to the pressure of the fluid at a predetermined level, a vertically extending standpipe, preferably of adjustable height, an inverted siphon between the standpipe and the generator, and a transverse connection between the standpipe and a vertically extending stackpipe. Upon generating a large gas bubble into the stackpipe, the gas acts as a piston within the stackpipe, pushing liquid upwardly therethrough, and thereby drawing liquid into the bottom. The continuous passage of such large bubbles through the stackpipe results in a current flow circulation through the large standing body of liquid. The advantage of the present type of large bubble generator, is that the generator can be placed at a position beneath the surface of the standing body of liquid a distance limited only by the rapidity at which a large bubble can be generated, as it is desirable that in steady state operation, a large bubble enter the stackpipe before the preceding large bubble has exited from the top.

18 Claims, 4 Drawing Figures

LIQUID CIRCULATING DEVICE

This is a continuation-in-part of copending application Ser. No. 3,707, filed Jan. 15, 1979, now U.S. Pat. No. 4,187,263.

The present invention relates generally to improvements in circulating devices for large standing bodies of liquids, and more particularly related to an improved "large bubble" generating system.

There are many procedures that require the maintenance and agitation of large standing bodies of liquid, and the concurrent heating or cooling to control the temperature of such bodies of liquids. The presence of a solid phase within the liquid generally necessitates a continuing agitation of the liquid in order to more uniformly suspend the solid within the body of liquid, and simultaneously to maintain a substantially uniform optimum temperature throughout the liquid. Such requirements are often met, inter alia, in sewage digestion systems, and most especially in anaerobic sewage systems where violent agitation in the atmosphere is not possible. Because of the nature of the solids often encountered in such systems, it is desirable that moving mechanical parts be avoided in direct contact with the body of liquid or the solids dispersed therein. Similarly, it is important that the conduits through which the liquid is caused to flow be sufficiently large as to decrease the likelihood of blockage or interference with the desired flow. Reliability, ease of servicing and maintenance, and the avoidance of any interference with the biological or chemical process being carried on in the liquid are of paramount importance.

Large bubble generators have often been used for the above purposes, as is shown, for example, in U.S. Pat. No. 3,592,450 to Rippon, U.S. Pat. No. 3,628,775 to McConnell, and U.S. Pat. No. 3,246,761 to Bryan et al. Many of these devices include gas bubble generators comprising a gas accumulator tank and an inverted siphon connecting the accumulator tank to a vertically rising stackpipe. See also application Ser. No. 749,670, filed Dec. 13, 1976, by Lipert, and now U.S. Pat. No. 4,169,873.

A further improvement in a large gas bubble type of circulation system is provided which comprises a substantially vertically extending, open-ended conduit stack, designed to be wholly submerged within the fluid; a large bubble generator, located adjacent the stack, and comprising a gas accumulator tank having a peripheral wall and a top wall, but open at the bottom; and a substantially vertically extending standpipe adjacent the accumulator tank and the vertical stack. The aforesaid three elements are in fluid flow connection via an inverted siphon connecting the upper portion of the accumulator tank to the standpipe and a transverse conduit between the upper end of the standpipe and the stackpipe, the transverse conduit connecting with the stackpipe through the peripheral wall of the stackpipe. A secondary liquid inlet means is provided into the transverse conduit; means for delivering gas under pressure into the accumulator tank is also provided.

In the preferred embodiment, there is provided an additional opening adjacent the bottom of the standpipe, which serves as a pressure vent and permits an increase in the frequency of bubble emission for a given volume accumulator tank, before "motoring" begins. This, accordingly, permits a shorter hydraulic length for the stackpipe above the transverse conduit, i.e., the bubble inlet to the stack. The lower standpipe opening can be restricted, especially where an intermediate bubble emission rate is desirable. Generally, the larger the lower standpipe opening, the greater is the maximum gas flow rate above which "motoring" begins; but, at the same time, the larger opening also requires a larger minimum air flow to avoid uneven operation. Generally, for the most common standpipe diameter of between about 4 ins. and 8 ins., the diameter of the lower orifice opening is about 25% of the internal diameter of the standpipe.

In a preferred embodiment of this type of generator, the junction between the standpipe and the transverse conduit to the stackpipe is open to the standing body of liquid. For example, this can be obtained by the use of a conical, or bell-shaped, inlet, decreasing in diameter towards the stackpipe, forming an open annulus around the open upper end of the standpipe. Generally, at least about 90% of the liquid pumped through the stack along with the passage of the large bubble of gas therethrough, enters the stack from its bottom opening. The remainder of the liquid enters the stack, following the gas bubble, through the secondary liquid inlet to the transverse conduit, such as the open annulus.

In a further preferred embodiment of this invention, the effective length of the standpipe can be made adjustable. This adjustment varies the bubble rate and the volume of each bubble passed from the generator. The "effective length" of the standpipe extends from the siphon inlet, to the secondary inlet. Decreasing the standpipe length to its minimum, i.e., so that it extends to just above the siphon inlet, increases the bubble rate, without motoring, to a maximum, but decreases the volume of each bubble to a minimum. In order to operate the stackpipe most efficiently as a mixing means, the volume of each generated bubble should be sufficient to fill the cross-section of the stackpipe.

To more fully define the operation of this preferred circulating apparatus: (1) The volume of the bubble varies directly with the volume of the gas accumulator tank, assuming constant standpipe length. (2) The volume of the bubble varies directly with the standpipe length, assuming constant accumulator tank volume. (3) The rate of bubble emission without motoring varies inversely with standpipe length, assuming constant gas feed to the accumulator tank.

The bottom of the stackpipe can be as little as 3 inches above the floor of the standing body of liquid if such is desirable, but optimally not more than about 12 inches from the floor. The open top of the stackpipe is located beneath the surface of the standing body of liquid a distance of preferably at least about three times the diameter of the stackpipe. The optimum distance between the liquid surface and the top of the stackpipe can be obtained by using a conventional "cone force" formula well known to those skilled in the art, to obtain optimum entrainment:

$$Q_E = (Q \times H / 3 \times D)$$

wherein
 Q is primary liquid flow through the stackpipe (ft.$^3$/min),
 H is stackpipe submergence (ft.),
 D is stackpipe diameter (ft.), and
 $Q_E$ is entrained flow (ft.$^3$/min.).

The transverse conduit connects into the stackpipe at a location sufficiently below the open top of the stack to permit and enhance the desired piston effect of the large gas bubble within the stackpipe. It has been found that the transverse conduit should be connected a distance below the top of the stack preferably equal to at least about four times the diameter of the stack (4·D) and preferably a distance up from the bottom of the stack equal to at least about three times the diameter of the stack (3·D).

The various features and advantages of the present invention will become more apparent from the accompanying drawings and the following verbal descriptions of preferred embodiments of the present invention. The descriptions and drawings, and the following examples, are given to merely show preferred examples of the present invention and are not intended to be exclusive of the scope thereof.

Referring to the drawings.

Figure 1:
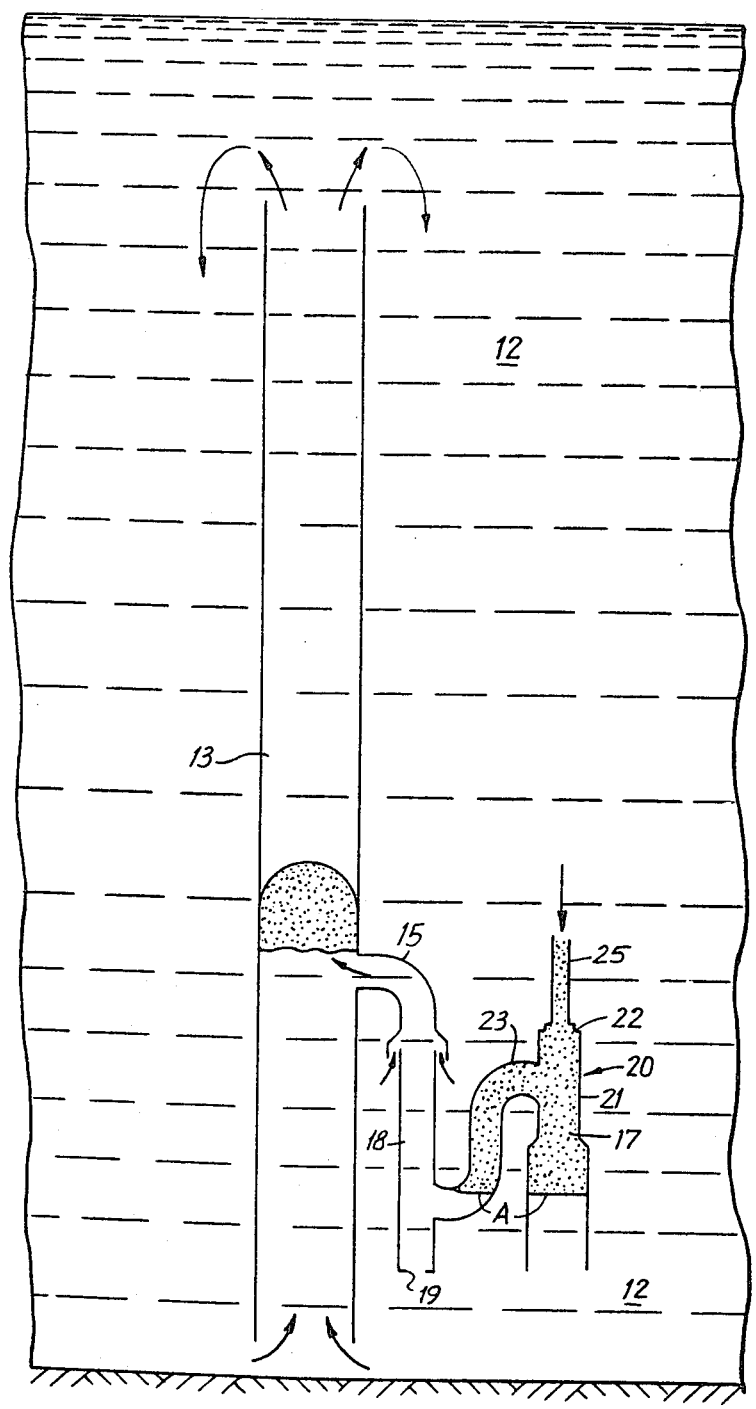
FIG. 1 is a diagrammatic elevation sketch of a [preferred] large bubble generator and accompanying standpipe and stackpipe.

Referring to FIG. 1, a first embodiment of the present invention is shown, by way of example, as being completely submerged in a body of an aqueous liquid 12, such as an anaerobic sewage digestion tank or the like, and comprises the open-ended vertical conduit or stack 13, supported within the body of liquid. The open lower end of the stackpipe can either be supported on a stand extending upward from the floor beneath the body of liquid, or by other means not shown. A side pipe 15, forming a T with the peripheral surface of the stackpipe 13 extends outwardly from the stack 13 ending in a flared, frusto-conical opening, pointing substantially downwardly. The frusto-conical inlet is downwardly, outwardly flared. A standpipe 18 is supported within the body of liquid, its open upper end centered within the flared opening of T-pipe 15, there being an annular opening between the end of standpipe 18 and the flared end of T-pipe 15. The lower end of standpipe 18 has a restricted orifice opening defined by lower plate 19. The plate 19 is sealed around its outer edges to the peripheral surface of pipe 18.

The bubble generator, generally indicated by numeral 20, is disposed generally adjacent to the standpipe 18 and stackpipe 13, also submerged within the standing body of liquid. The "large-bubble" generator 20 comprises a circular cylindrical gas accumulator tank 17, having a flat circular top wall 22, and a depending cylindrical peripheral wall 21. The peripheral wall 21 defines a completely open bottom, open to the body of liquid. A bent conduit 23 projects through and extends outwardly from an opening through the peripheral wall 21 of the accumulator tank. The second end of curved pipe 23 connects through the peripheral wall of standpipe 18, whereby the curved pipe 23 and standpipe 18 form an inverted, U-shaped siphon, leading from the accumulator tank 20 to the flared opening of the transverse T-pipe 15.

In the operation of the large bubble generator embodiment described above, a gas is delivered to the gas accumulator tank 20 through inlet pipe 25. The gas, which is under pressure, enters accumulator tank 20, lowering the water level therein, and simultaneously lowering the water leg within bent pipe 23. As soon as the water level within accumulator tank 20 reaches below the level of the upper edge of the second bend in pipe 23, the level indicated by the letter A in FIG. 1, all of the gas within tank 20 and leg 23 is rapidly siphoned out through leg 23 into standpipe 18 as a single large bubble. The large bubble rises upwardly through the standpipe 18, entering the flared opening of transverse pipe 15 and then into the stackpipe 13. The single large bubble expands to take up the entire cross-section of stackpipe 13, thus serving to raise all of the liquid within the pipe above the bubble. As the large bubble pushes the water out the top of the stackpipe in front of it, additional liquid is brought into the stackpipe through its bottom opening. As shown in the diagram of FIG. 1, by the arrows, a circulation through the standing body of liquid is thus obtained. As the bubble moves upwardly through the stackpipe 13, the bubble generating cycle is repeated, as the gas inlet continues to supply additional gas into the gas generator accumulator tank 21. In the preferred embodiment of this operation, a second gas bubble is generated up through the standpipe 18 before the preceding large gas bubble is ejected from the upper end of the stackpipe 13.

In addition to the liquid brought into the stackpipe through the open bottom thereof, a small percentage of liquid is also drawn in through the annular opening between the flared transverse part 16 and the standpipe 18. Generally, not more than about 20 percent of the water flowing through the stackpipe is drawn in through the annular opening, and optimally not more than about 5 percent is drawn in through the annular opening. The annular opening is especially desirable when the transverse pipe enters the stackpipe at a significant distance above the bottom opening of the stackpipe. This secondary inlet serves to avoid any vacuum effect that may otherwise be created within the large bubble generator and thus acts to supplement the opening at the bottom of the standpipe, to enable operation at higher gas flow rates without motoring.

Figure 2:
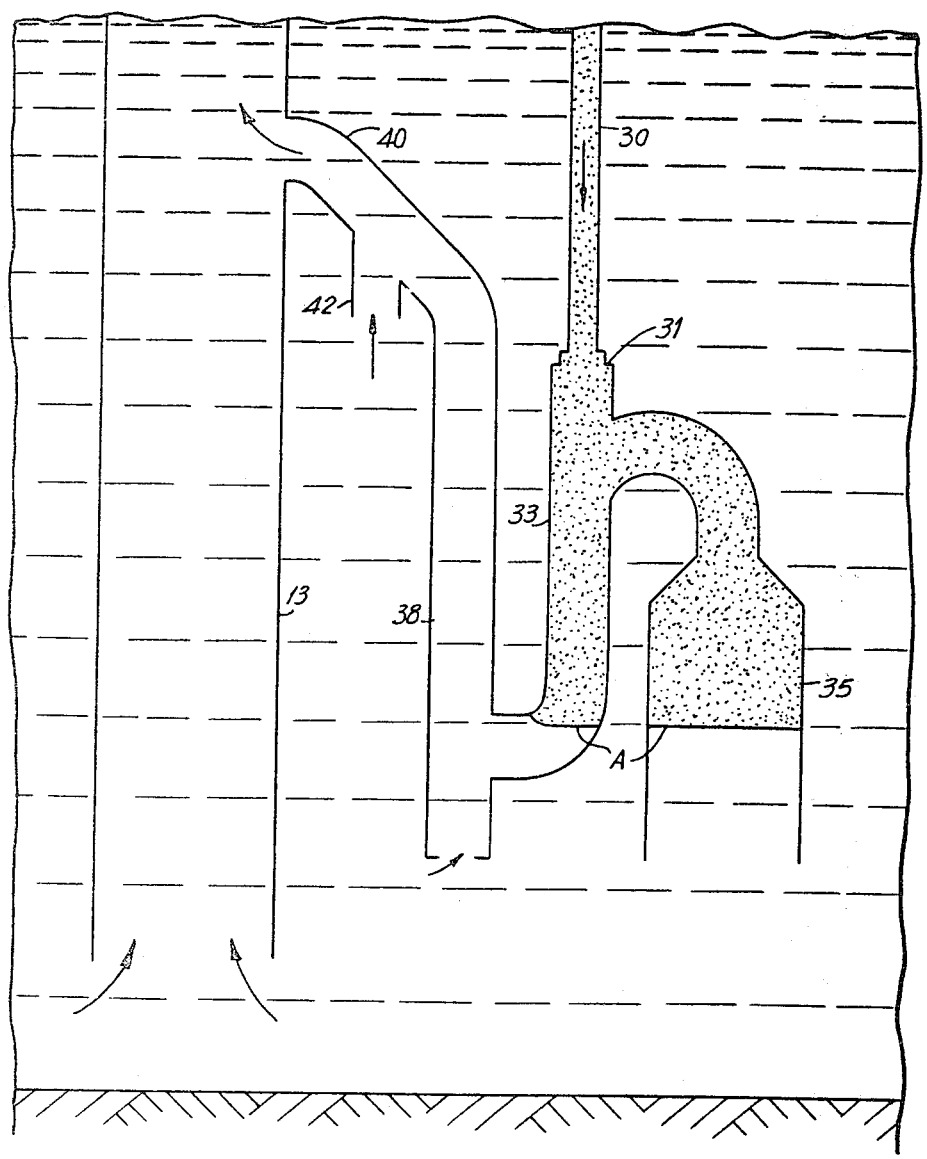
FIG. 2 is a side elevation sketch of an alternative embodiment of a large bubble generator and accompanying standpipe and stackpipe.

Referring to FIG. 2, an alternative embodiment of the gas generator and stackpipe is depicted. The gas inlet 30 enters through a flat plate 31 above an extended portion of a bent curved pipe 33. The bent curved pipe is connected to the upper end of a gas accumulator tank 35, which is completely open at the bottom. The other end of the bent pipe 33 connects through the peripheral wall of standpipe 38, having a restricted lower opening, but connected directly to a transverse T-pipe 40 at its upper end, which is connected directly through the peripheral wall of the stackpipe 13. The connection between the transverse pipe 40 and standpipe 18 does not provide for the annular inlet opening as in FIG. 1, but an equivalent supply of liquid is provided by a secondary inlet pipe 42, connected into the transverse T-pipe 40 at a point downstream from the connection with standpipe 38. Again, the great majority of liquid enters the stackpipe 13 through its open bottom, but a smaller proportion, again in the range of between 5 and 20 percent, enters through the secondary T-pipe 42. As is also shown by this embodiment, the location of a gas inlet 30 is not crucial, as long as it is about the level "A", at which the liquid seal between the accumulator tank 35 and the standpipe 38 is broken, permitting the large bubble to be released and travel through the standpipe 38 and into the stackpipe 13. Once again, the restricted opening at the bottom of standpipe 18, permits an increase in the frequency of bubble emission compared to a closed bottom end.

The advantage of the embodiments of FIGS. 1 and 2, is that the large gas bubble is generated at a point intermediate the upper and lower ends of the stackpipe 13. This permits the use of a lower pressure gas supply than would be the case if the gas had to be fed in at the bottom of the stackpipe. Thus, the use of a transverse connection between the gas accumulator tank and the stackpipe permits the design of the most efficient system, where the energy supply can be used to maximum effect. The distance below the top of the stackpipe 13, at which the transverse pipe enters the peripheral wall thereof, need be limited only by the rate at which the large gas bubble rises through the liquid and the rate at which a large bubble can be generated without producing "motoring" of the gas generator unit. For any given system of gas and liquid, the rate at which the bubble will rise through the stackpipe can be determined. Thus, in the preferred embodiment, the distance below the top opening of the stackpipe at which the large gas bubble enters the stackpipe is limited by the rate at which a bubble can be generated. The quicker a bubble can be generated without causing motoring, the closer to the top of the stackpipe the bubble can enter, and thus, the smaller the pressure required to generate the bubble. Gas is supplied from a source (not shown) located outside of the digestion tank.

Figure 3:
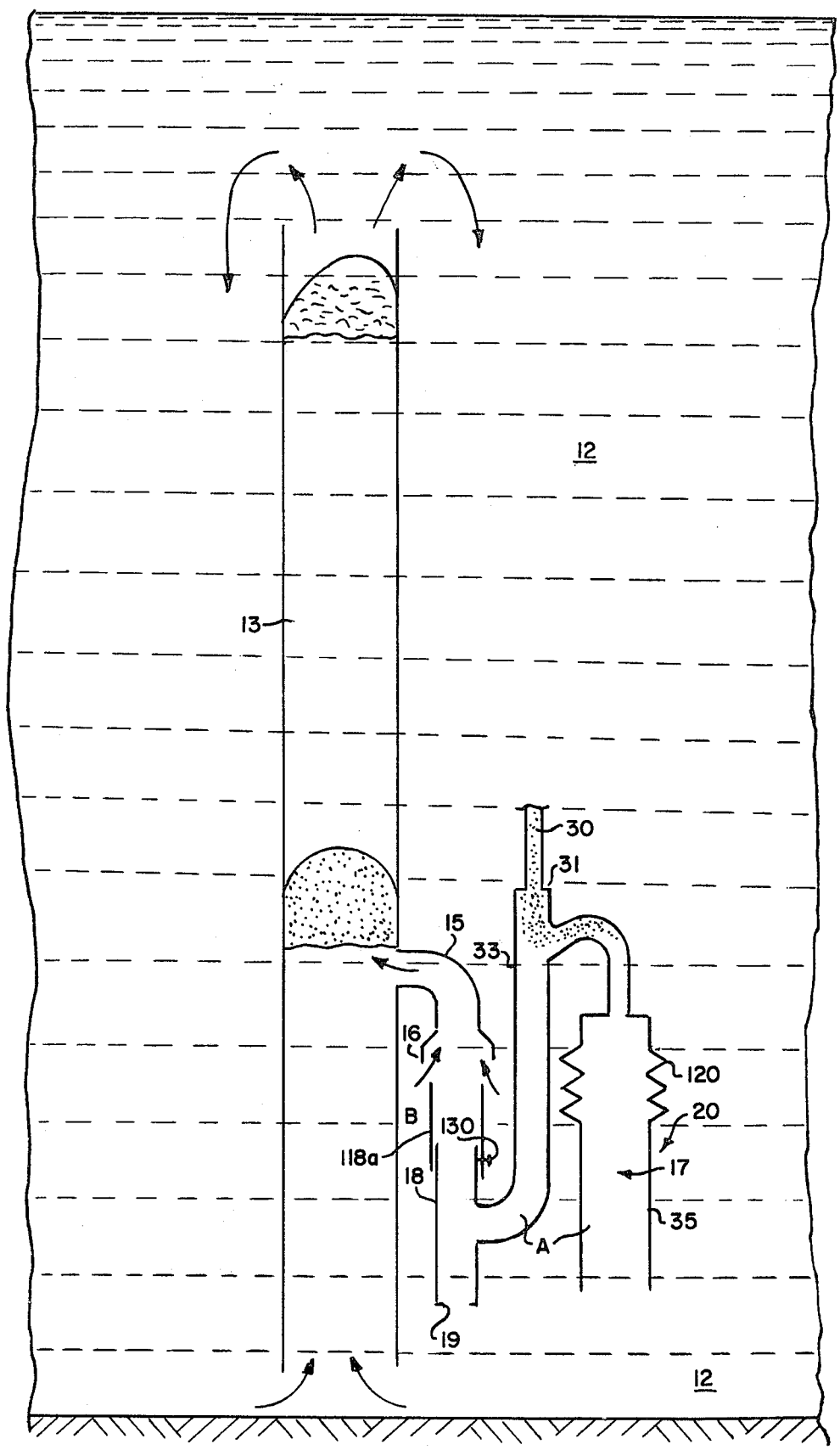
FIG. 3 is a side elevation sketch of a large bubble generator having an adjustable length standpipe and an adjustable volume accumulator tank.

FIG. 3 depicts a similar type of gas generator as in FIGS. 1 and 2, but provides means for adjusting the effective length of the standpipe 18 and the volume of the accumulator tank 20. The "effective length" is from level "A" to level "B".

The standpipe adjustment means shown comprises a sleeve 118a extending along the exterior of the basic standpipe 18, that can be locked in any position, from wholly within to fully extended. The sleeve 118 is shown in an almost fully extended position. This type of device is continuously adjustable, and can be locked in the desired position by thumbscrew 130, for example, which is threadedly secured through an opening through the sheet metal sleeve 118a and abuts against the outer surface of the standpipe 18.

Alternative means for varying standpipe length include threaded pipe lengths which can be threadedly secured to the generator at level "A", which provides incremental length adjustments, and a bellows arrangement substituting for the rigid standpipe 18, which can be continuously varied in length within its range. Any combination of these, or other equivalent means, can be utilized for the same effect.

The volume of the accumulator tank 20 can be varied by, for example, the extendible bellows arrangement 120, shown in FIG. 3, or other means which expand the size of the tank 20; or alternatively, means to vary the interior volume, such as an inflatable bladder within the accumulator tank 20, inflated with either a gas or liquid, can be provided.

As shown in FIG. 3, the top of the standpipe, level "B", is just below the lower end of the flared portion 16 of T-pipe 15. This is permitted as long as the vertical distance is not so great as to permit part of the air bubble to escape into the tank liquid. The vertical gap increases the liquid flow for a given difference between standpipe o.d. and flared end i.d.

Figure 4:
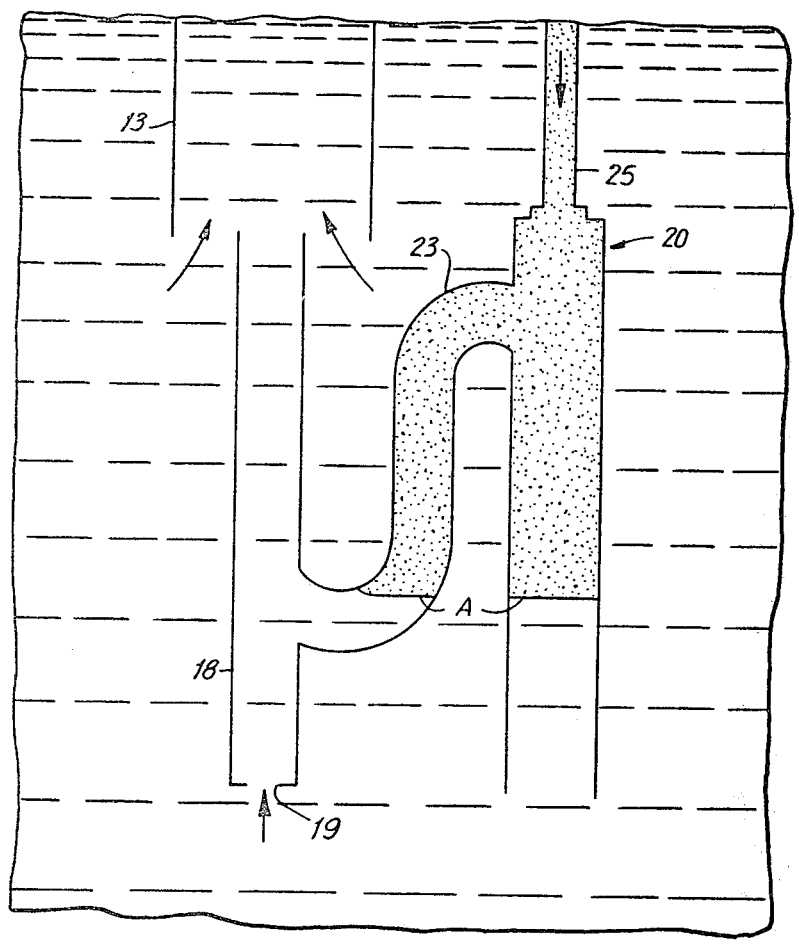
FIG. 4 is another embodiment of the large bubble generator of the present invention shown in a secondary relationship to a stackpipe.

Referring to FIG. 4, in this embodiment the gas bubble generator empties into the bottom opening of the stackpipe. Although in this embodiment, two of the advantages of the embodiments, of FIGS. 1 to 3 are not obtained, i.e., the placement of the lower opening as close to the bottom as possible and the greater efficiency of the accumulator by operating at a lower pressure, the particular design of the accumulator shown in FIG. 3 continues to result in an improvement in the speed at which a gas bubble can be generated without creating "motoring".

The following examples further provide descriptions of preferred embodiments of the present invention.

EXAMPLE I

In a large anaerobic sewage digestion tank, having a total capacity of 100,000 gallons with a liquid height of about 20 feet, a stackpipe approximately 15 feet long is provided, the lower end being supported approximately 6 inches above the floor of the tank, the upper end approximately 4½ feet below the top surface of the liquid. The stackpipe has an internal diameter of 18 inches. A transverse T-pipe connects into the stackpipe at a location of about 6 feet below the open top end of the stackpipe. The T-pipe has an internal diameter of about 6 inches; however, the open end flares out to a diameter at its inlet end of approximately 8 inches internal diameter, the opening pointing substantially straight downwardly.* A standpipe having an open top end facing into and substantially level with the flared inlet to the transverse pipe has an internal diameter of 6 inches. The bent pipe 23 also has an internal diameter of about 6 inches and the gas accumulator tank 21 has an internal volume of about 1750 cubic inches, with an internal diameter of about 10 inches. Level "A" in FIG. 1 is located approximately two feet below the top 22 of the accumulator tank 20. The orifice 19 at the bottom of standpipe 18 has a diameter of approximately 2 inches; gas is supplied through inlet 25 at 7.0 p.s.i. gauge, at a rate of approximately 70 cubic feet/minute, measured at gauge pressure. A large gas bubble is generated every 1.5 seconds. The gas in the pressurized digestion tank, above the surface of the liquid, is maintained at a pressure of 0.5 p.s.i.g. (above atmospheric pressure). An extremely efficient circulation of the large standing body of liquid is thus obtained, with a minimum clogging caused by the solid particles within the digesting liquid. Further, due to the large diameter and substantially straight nature of the majority of the piping system, the air supply line can also be used for double duty for "rodding" out of the air accumulator, to clean out any deposits formed therein.
*See FIG. 1

EXAMPLE II

Referring to the drawing of FIG. 2, a stackpipe having a diameter of 12 inches is completely immersed in its substantially vertical position as shown, within a 100,000 gallon tank, holding a supply of standing liquid having a height of about 20 feet. The bottom of the stackpipe is approximately 6 inches above the floor of the tank, the open top is approximately 3 feet below the top surface of the liquid. The transverse side pipe 40 has a nominal internal diameter of 8 inches, and the standpipe 38 and bent pipe 33 (forming the inverted siphon) have a nominal internal diameter of 4 inches. The diameter of the gas accumulator tank 35 is about 8 inches, and the distance from the top of the tank 35 to level "A"

is about 1 foot. The transverse pipe 40 enters the peripheral wall of the stackpipe 13 at a level about 7 feet below the top of the stackpipe. The restricted lower opening to the standpipe 38 has an orifice diameter of about 1½ inches and the secondary inlet 42 has a nominal internal diameter (i.d.) of about 6 inches.

Air is supplied to the gas supply line 30 at a pressure of about 6.5 p.s.i.g., and a volumetric flow rate of about 18 cubic feet per minute measured at gauge pressure. A large bubble is generated every 2 seconds, a bubble being generated before the preceding bubble has been ejected from the top of the stackpipe 13. Between 80 and 95 percent of the liquid entering the stackpipe enters through the bottom and about 5–20 percent enters through the secondary inlet 42. The large bubble as it rises through the stackpipe substantially fills the cross-section thereof, acting as a piston to force the liquid above out the top of the stackpipe.

The stackpipe diameter should be sufficient to permit a flow of liquid sufficient to provide a significant current flow in the standing body of liquid. The accumulator tank and standpipe diameter should be such as to ensure adequate gas accumulation without excessive accumulator tank length, and to generate and pass a large gas bubble at an acceptable velocity and configuration, but sufficiently large to avoid any clogging due to agglomeration of solids on the standing liquid. Table I provides a preferred range of internal diameter sizes for each of these units, based upon commercial usage for stackpipe sizes of from 4 to 24 in., internal diameter. Generally, commercial stackpipes are available up to about 36 in. i.d.

TABLE I

| Stackpipe Diameter (in.) | Accumulator Tank Diameter (in.) | Standpipe Diameter (in.) |
|---|---|---|
| 24 | 6 | 5–6 |
| 24 | 8 | 5–8 |
| 24 | 10 | 5–10 |
| 24 | 12–24 | 5–10 |
| 18 | 5 | 3–5 |
| 18 | 6 | 3–6 |
| 18 | 8–16 | 3–8 |
| 12 | 4 | 3–4 |
| 12 | 5 | 3–5 |
| 12 | 6–8 | 3–6 |
| 4–6 | 2 | 1.5–2 |
| 4–6 | 2.5 | 1.5–2.5 |
| 4–6 | 3 | 1.5–3.0 |
| 4–6 | 4 | 1.5–4.0 |

EXAMPLE III

Referring to FIG. 3, the test procedure of Example I was repeated several times, but varying the effective standpipe 118a length, gas flow rate, stackpipe diameter, accumulator tank 20 volume. This series of tests were carried out with standpipe 18 that had a fully closed orifice, i.e. a diameter of 0 inches.

The tests were carried out in a cylindrical tank having a diameter of 3 ft., and filled with water to a height of 3.5 feet. The stackpipe 13 was about 2.5 ft. long and was held so that the bottom was 4 inches above the tank's floor. The standpipe 18 and accumulator 20 had an internal diameter of 2.5 inches, the total accumulator volume being 280 cubic inches. The transverse T-pipe 15 was joined to the stackpipe 13, 1.5 ft. below the open top end of the stackpipe. The gas (air) flow was measured by a rotameter located in the air flow line 30 between a compressor unit (not shown in the drawings) and the accumulator tank inlet 31. The airflow line 30 had a ¾ inches i.d. The data obtained, including gas flow in cubic feet per hour, bubble emission frequency (measured as a bubble per second), and the volume of the bubble (cubic inches), when released from the top of the stack into the main body of liquid, and the varying apparatus dimensions, are set forth in Table II:

TABLE II

| Gas flow (cu. ft./hr.) | Bubble Emission Frequency (N) (1/N Sec.) | Bubble Volume (in$^3$) | Stackpipe Diameter (in.) | Standpipe Length (in.) | Diameter of Transverse T-Pipe Flared end (in.) |
|---|---|---|---|---|---|
| 75  | 0.9  | 31  | 4 | 2.5  | 3 |
| 100 | 0.88 | 40  | 4 | 2.5  | 3 |
| 125 | 0.87 | 50  | 6 | 2.5  | 3 |
| 150 | 0.83 | 57  | 6 | 2.5  | 3 |
| 200 | 0.78 | 72  | 6 | 2.5  | 3 |
| 250 | 0.76 | 88  | 6 | 2.5  | 3 |
| 300 | 0.72 | 99  | 6 | 2.5  | 3 |
| 75  | 2.41 | 83  | 6 | 7.5  | 3 |
| 100 | 1.77 | 82  | 6 | 7.5  | 3 |
| 125 | 1.42 | 82  | 6 | 7.5  | 3 |
| 150 | 1.38 | 96  | 6 | 7.5  | 3 |
| 200 | 1.28 | 118 | 6 | 7.5  | 3 |
| 250 | 1.22 | 141 | 6 | 7.5  | 3 |
| 300 | 1.09 | 151 | 8 | 7.5  | 3 |
| 75  | 3.49 | 121 | 6 | 12.5 | 3 |
| 100 | 2.70 | 121 | 6 | 12.5 | 3 |
| 125 | 2.11 | 122 | 6 | 12.5 | 3 |
| 150 | 1.87 | 129 | 6 | 12.5 | 3 |
| 200 | 1.62 | 149 | 8 | 12.5 | 3 |
| 250 | 1.49 | 172 | 8 | 12.5 | 4 |
| 300 | 1.45 | 201 | 8 | 12.5 | 4 |
| 75  | 4.75 | 164 | 8 | 17.5 | 4 |
| 100 | 3.57 | 165 | 8 | 17.5 | 4 |
| 125 | 2.90 | 165 | 8 | 17.5 | 4 |
| 150 | 2.41 | 167 | 8 | 17.5 | 4 |
| 200 | 2.11 | 195 | 8 | 17.5 | 4 |
| 250 | 1.85 | 212 | 8 | 17.5 | 4 |
| 300 | 1.73 | 240 | 8 | 17.5 | 4 |

EXAMPLE IV

The procedure of Example III was followed except that the standpipe 18 and the accumulator tank 20 had an internal diameter of 3 inches, the tank 20 having a total accumulator volume of about 70 cubic inches. The standpipe 18 length was 10 inches and had a fully closed orifice and the internal diameter of the flared end of the transverse T-pipe 15 was 4 inches.

The data are set forth in Table III.

TABLE III

| Gas Flow (cu.ft. 1 hr.) | Bubble Emission Frequency (1/N sec.) | Bubble Volume (cu. in.) | Stackpipe Diameter (in.) |
|---|---|---|---|
| 100 | 1.53 | 71  | 6 |
| 200 | 1.39 | 128 | 6 |
| 300 | 1.18 | 164 | 8 |
| 400 | 1.00 | 184 | 8 |
| 500 | 0.95 | 220 | 8 |

EXAMPLE V

Referring to FIG. 1, the procedure of Example III was repeated, but varying the diameter of the orifice 19 in standpipe 18. The stackpipe 13 had an internal diameter from 6 to 12 inches, and the standpipe 18 and accumulator tank 20 each had an internal diameter of 3 inches, with a total accumulator tank volume of 70 cubic inches. The standpipe length was 10 inches, and the top of the standpipe was level with the top of the main accumulator tank 20.

TABLE IV

| Orifice Diameter (in.) | Air Flow (cu. ft. /hr.) | Bubble Emission Frequency (1/N Sec.) | Bubble Volume (cu.in.) | Stack-pipe Diameter (in.) | Diameter of T-Pipe Flared End (in.) |
|---|---|---|---|---|---|
| 0 | 100 | 7.26 | 335 | 10 | 4 |
| 1.5 | 100 | 4.26 | 197 | 8 | 4 |
| 3 | 100 | 1.49 | 69 | 6 | 4 |
| 0 | 200 | 4.46 | 412 | 10 | 5 |
| 1.5 | 200 | 2.56 | 236 | 8 | 4 |
| 3 | 200 | 1.39 | 128 | 6 | 4 |
| 0 | 300 | 3.20 | 443 | 10 | 5 |
| 1.5 | 300 | 2.2 | 305 | 10 | 5 |
| 3 | 300 | 1.25 | 177 | 8 | 4 |
| 0 | 400 | 2.82 | 521 | 12 | 6 |
| 1.5 | 400 | 1.94 | 358 | 10 | 5 |
| 3 | 400 | 1.18 | 218 | 8 | 4 |
| 0 | 500 | 2.44 | 563 | 12 | 6 |
| 1.5 | 500 | 1.8 | 415 | 10 | 5 |
| 3 | 500 | 1.1 | 254 | 8 | 4 |

The patentable embodiments of this invention which are claimed are as follows:

1. A device for creating circulation within a body of liquid, the device comprising a substantially vertically extending stackpipe means designed to be wholly submerged within the liquid, the stackpipe having an upper discharge opening and a lower inlet opening; a large-bubble generator means located adjacent the stackpipe and comprising a gas-accumulator chamber having a peripheral wall, a top wall, and an opening at the chamber bottom; a substantially vertically extending standpipe adjacent the accumulator chamber and the stackpipe; an inverted siphon defining fluid flow connecting means between the upper portion of the accumulator chamber and the standpipe; means for delivering gas under pressure into the accumulator chamber; transverse gas flow conduit means between the upper end of the standpipe and the stackpipe, the transverse conduit connecting through the peripheral wall of the stackpipe; and secondary liquid inlet means into the transverse conduit between the standpipe and the stackpipe.

2. The device of claim 1 wherein the transverse conduit connects at a first end into the stackpipe at a position located below the top end of the stackpipe a distance of at least about four times the diameter of the stackpipe (4·D).

3. The device of claim 2 wherein the second end of the transverse conduit comprises a divergent opening, having a maximum diameter greater than that of the upper end of the standpipe, the upper end of the standpipe opening into the divergent opening and defining an annular clearance between the standpipe upper end and the divergent opening, providing for the secondary inlet of liquid into the stackpipe.

4. The device of claim 2 wherein the position is located above the bottom end of the stackpipe a distance of at least about three times the diameter of the stackpipe (3·D).

5. The device of claim 4 wherein the lower end of the standpipe is closed.

6. The device of claim 1 wherein the lower end of the standpipe is open.

7. The device of claim 6 wherein the lower standpipe opening is a retricted orifice opening.

8. The device of claim 6 wherein the ratio of the area of the secondary inlet opening-to-the area of the open lower end of the stackpipe is designed to provide for not more than about 10 percent of the liquid flow to enter the stackpipe through the transverse conduit.

9. The device of claim 1 wherein the secondary inlet to the transverse conduit is through a peripheral wall of such transverse conduit, adjacent to the peripheral wall of the stackpipe and is open to the liquid in which the device is designed to be submerged.

10. The device of claim 1, comprising first adjusting means to adjust the vertical length of the standpipe.

11. The device of claim 10, wherein the first adjusting means comprises a sleeve slidably secured to the standpipe.

12. The device of claim 1 comprising second adjusting means for adjusting the volume of the accumulator tank.

13. A system for treating sewage and the like in a liquid body, comprising a tank for the liquid sewage; a substantially vertically extending stackpipe positioned within said tank; the stackpipe having a lower inlet opening and an upper discharge opening below a predetermined level within said tank; a large-bubble generator means located within the tank adjacent the stackpipe; and comprising a gas accumulator chamber having a peripheral wall and a top wall, the bottom of the chamber being substantially open; a substantially vertically extending standpipe adjacent the accumulator chamber and the stackpipe within the tank; an inverted siphon defining fluid flow connecting means between the upper portion of the accumulator chamber and the standpipe; pressure means for delivering gas under pressure into the accumulator chamber; transverse gas flow conduit means between the upper end of the standpipe and stackpipe; the transverse conduit connecting through the peripheral wall of the stackpipe at one end of the conduit; and secondary liquid inlet means into the transverse conduit between the standpipe and the stackpipe, whereby the generation of a large-bubble of gas passes from the accumulator chamber up through the stackpipe, acting as a piston to generate a current flow through a large body of liquid within the tank.

14. The system of claim 13 wherein the bottom end of the stackpipe is located a distance of between about 3 inches and about 12 inches above the bottom of the tank, sufficiently above the bottom to permit the flow of liquid from the tank up through the stackpipe.

15. The system of claim 13 wherein the top end of the stackpipe is located a distance of at least about three times the diameter (D) of the stackpipe (3·D) below the surface of any liquid in the tank.

16. The system of claim 13, comprising first adjoining means to adjust the vertical length of the standpipe.

17. The system of claim 16, wherein the first adjusting means comprises a sleeve slidably secured to the standpipe.

18. The system of claim 13, comprising second adjusting means for adjusting the volume of the accumulator tank.

* * * * *